A. ROBB.
Car-Brakes.

No. 154,419.  Patented Aug. 25, 1874.

Witnesses:  
L. Stackhouse  
Morris Frank

Inventor:  
Alonzo Robb  
by Jno. Everding  
his Atty

UNITED STATES PATENT OFFICE.

ALONZO ROBB, OF PHILADELPHIA, PENNSYLVANIA, ASSIGNOR OF ONE-HALF HIS RIGHT TO JAMES G. CARSON, OF SAME PLACE.

IMPROVEMENT IN CAR-BRAKES.

Specification forming part of Letters Patent No. 154,419, dated August 25, 1874; application filed June 25, 1874.

*To all whom it may concern:*

Be it known that I, ALONZO ROBB, of the city and county of Philadelphia, in the State of Pennsylvania, have invented certain new and useful Improvements in Brakes for Railroad-Cars and other vehicles, of which the following is a specification:

The object of my invention is to provide a simple, durable, and effective arrangement of mechanism for braking land conveyances, to which end my improvements consist in combining friction-wheels secured upon the axles of the car, with wood-lined metallic bands encircling said friction-wheels, and rods, links, or chains connecting the bands, so that the brakes can be simultaneously applied, and from either end of the car, as hereinafter more fully set forth.

Figure 1:
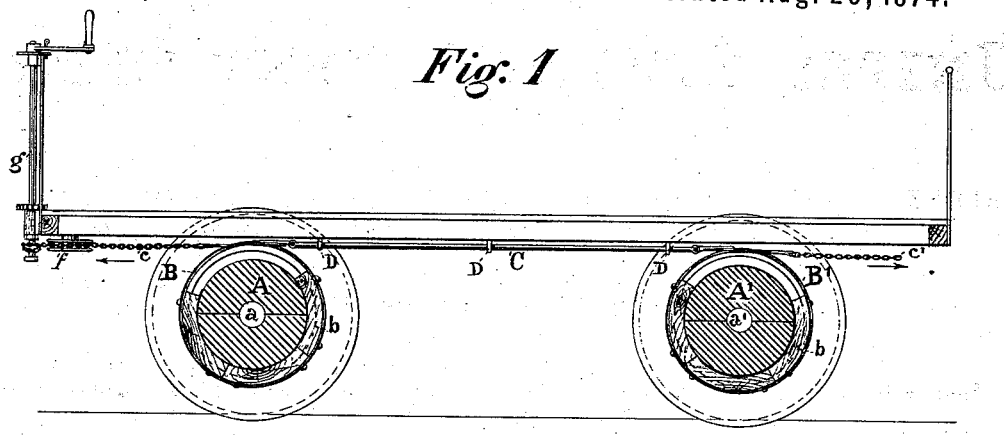
Figure 2:
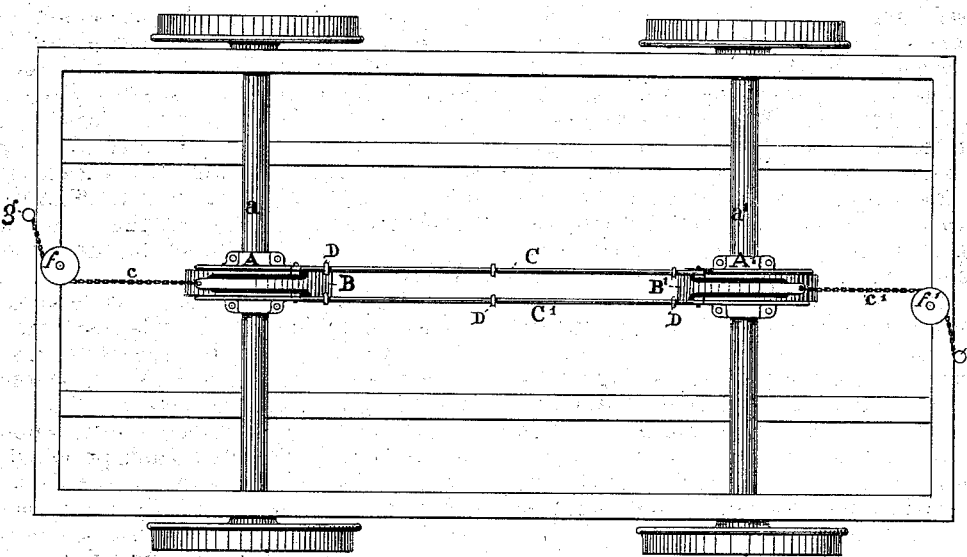

In the accompanying drawings, Figure 1 is a longitudinal section through a car embodying my improvements, and Fig. 2 a bottom view of the same.

Friction-wheels A A', which are, by preference, made in halves and bolted together, are secured, respectively, upon the axles $a$ $a'$ of the car, said friction-wheels being, respectively, encircled by the metallic bands B B', each of which is lined with segments of wood $b$ $b$. The adjacent ends of the bands B B' are connected by the horizontal rods C C', which move freely longitudinally in guides or staples D secured to the bottom of the car. A chain or chains may be used to form the connection between the bands, if desired, but I consider that rods, as shown, are preferable. Chains $c$ $c'$ are, respectively, connected to the outer ends of the bands B B', and, passing around sheaves $f$ $f'$, have their opposite ends connected to vertical brake-shafts $g$ $g'$, each of which is provided with a suitable pawl and a crank wheel or handle.

The operation of my improved brake is as follows: The chains $c$ $c'$ being slackened, the bands B B' will be correspondingly slackened, and the wooden segments $b$ $b$ will stand away from the peripheries of the friction-wheels A A, and consequently will oppose no resistance to the rotation of the axles. Upon the rotation of either of the brake-shafts $g$ $g'$ the bands B B' will be simultaneously drawn tightly around the friction-wheels, and the wooden segments be correspondingly clamped to their peripheries, thus providing an effective and simple friction-brake, which can, moreover, be operated from either end of the car with equal facility.

The arrangement shown and described is applicable to four or six wheeled cars; but where the brake is to be applied to cars having separate trucks one brake-shaft only to each truck would be required.

I am aware that friction-wheels wholly or partially encompassed by bands provided with segment-blocks have been heretofore known, and do not, therefore, broadly, claim such device; nor do I claim the simultaneous operation of a series of brakes from either end of a vehicle.

I claim as my invention—

The continuous series of friction-wheels, each mounted upon an axle, and the encircling friction-band, with rods or chains, connecting their adjacent ends, so that they may be simultaneously applied from either end of the series by the movement of a single brake-lever, all combined substantially as set forth.

ALONZO ROBB.

Witnesses:
 ROB. C. ARTHUR,
 JNO. H. HOGAN.